Figure 1:
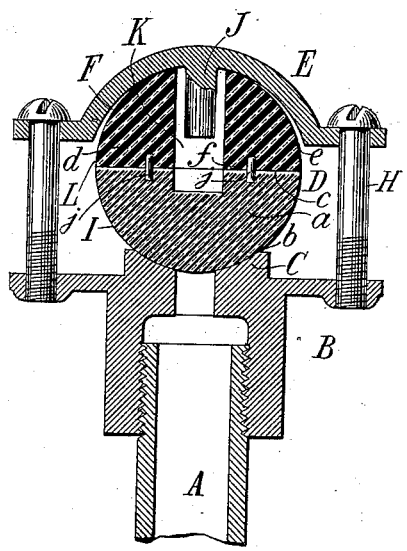

No. 661,603. Patented Nov. 13, 1900.
E. E. GOLD.
SAFETY VALVE AND VALVE PROPER.
(Application filed May 5, 1897.)
(No Model.)

WITNESSES:
Fred White
Thomas F. Wallace

INVENTOR:
Edward E. Gold,
By his Attorneys,
Arthur T. Fraser

THE NORRIS PETERS CO., PHOTO-LITHO., WASHINGTON, D. C.

UNITED STATES PATENT OFFICE.

EDWARD E. GOLD, OF NEW YORK, N. Y.

SAFETY-VALVE AND VALVE PROPER.

SPECIFICATION forming part of Letters Patent No. 661,603, dated November 13, 1900.

Application filed May 5, 1897. Serial No. 635,110. (No model.)

*To all whom it may concern:*

Be it known that I, EDWARD E. GOLD, a citizen of the United States, residing in the city, county, and State of New York, have invented certain new and useful Improvements in Valves and Valves Proper and the Like, of which the following is a specification.

This invention relates to valves and like devices and to valves proper or seats for such devices, and is especially applicable to safety or puppet valves and to valves proper therefor.

Heretofore it has been customary to use a rubber or other yielding block as a valve proper for safety-valves, this being held tight against a seat to close the latter until the pressure exceeds the elastic resistance of the block, whereupon the latter would yield and permit escape of pressure until the pressure fell below such resistance. This construction is shown in my Letters Patent No. 563,371, dated July 7, 1896.

In valves of the described class it is found that the rubber is liable to be impaired by contact with the seat or by the temperature or nature of the fluid under pressure, so that its impermeability is destroyed or its elasticity is impaired. In my said patent I interposed a loose brass plate between the rubber block and the valve-opening to diminish this disadvantage.

My present invention aims to provide a valve proper which combines in itself both an elastic or yielding material and a suitable seating material for resisting injury from contact with the valve-seat and impairment from contact with the fluid under pressure.

To this end in carrying out my invention as applied to a valve of the described class I provide a valve proper consisting of a block or body composed of two materials, the one a facing member of relatively unyielding material and the other a backing member of relatively yielding elastic or soft material, the materials being differentiated to best suit the requirements of use and adapted the one to contact with the valve-seat or fluid under pressure therein and the other with a suitable holder or stem for retaining the valve proper opposite the seat. Preferably the facing member of the valve proper is formed of Jenkins or other suitable semiyielding or very slightly compressible composition packing or seating material and is adapted to engage the seat, and the backing member is formed of elastic rubber fixed to the first and adapted to be compressed between it and the holder to avail of the elastic resistance of the rubber as a means for holding the valve proper closed against a predetermined limit of pressure.

Figure 2:
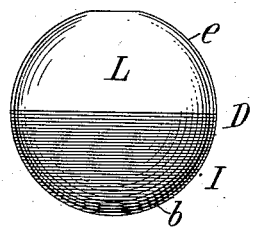
Figure 3:
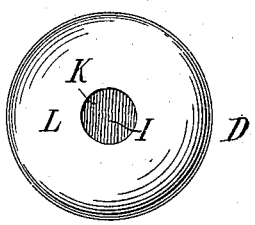
Figure 5:
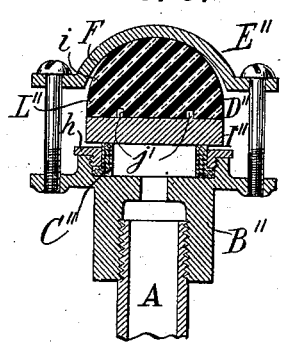
Figure 4:
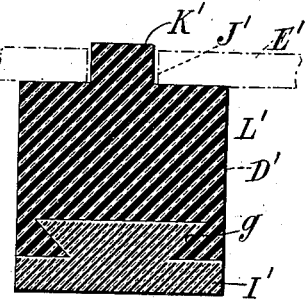
Figure 6:
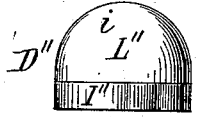

In the accompanying drawings, which illustrate certain adaptations of my invention, Figure 1 is an axial section of a safety-valve, showing the preferred form of my improved valve proper. Fig. 2 is a side elevation of the latter. Fig. 3 is a plan view thereof. Fig. 4 is an axial section showing a modified form of valve proper. Fig. 5 is a view similar to Fig. 1, showing a modified construction of safety-valve and valve proper; and Fig. 6 is a side elevation of the valve proper shown in Fig. 5.

Referring first to Figs. 1, 2, and 3, I will describe in detail the preferred form of my improved valve proper and its use with the valve therein shown. In these figures let A represent the end of a pipe or other object to which the valve B is applied. C is the seat of the valve. D is the valve proper. E is a holder therefor. F is the holding socket or portion of the holder. H represents the compressing provisions or screws for adjusting the holder toward the seat. J is a guiding provision or projection on the holder, and K is a reciprocal provision or socket in the valve proper. These parts may be of any usual or suitable construction and are taken as an example of a simple form of valve device to which my improvements are applicable.

The improved valve proper according to my present invention consists of two different parts I and L, preferably fixed together at their adjacent portions and differentiated in quality, so that the one shall be a suitably wearing and relatively non-yielding portion and the other a suitably yielding and relatively soft and elastic portion. The part I or facing member is preferably the relatively non-yielding part and is best constructed of semiyielding composition or other suitable seating material—such, for example, as the Jenkins packing material. It is shown as formed with an imperforate body $a$, a convex or other suitably-formed seating-face $b$ for engaging the seat C, and a flat or other suitably-formed face $c$ at its opposite side for receiving the part L. The part L or backing member is preferably composed of a body $d$ of rubber, having a convex outer face $e$ remote from the face $b$ of the part I for engaging the holder E, and a flat or otherwise suitably-formed face $f$, fitting the face $c$ of the part I. These two faces are preferably connected together in any suitable manner, as by cementing together. The part L is preferably constructed with suitable guiding provisions for preventing its displacement relatively to the holder. As shown, it is formed with the socket K for this purpose, which socket extends entirely through the part L and slightly into the part I, so that the part L is of annular form. This socket receives the guiding projection J of the holder and prevents undue displacement of the valve proper.

As shown, the parts I and L are hemispherical, constituting together a spherical body of combined yielding and seating materials. The convex top and bottom faces of this body enable it to suitably seat itself between the opposite concave faces of the seat C and the socket F, while the socket K and projection J prevent such rotation of the valve proper as would bring the rubber into proximity with the valve-seat. I prefer to form the parts I and L separately, molding them to the desired shape, and then to connect them together by cementing or otherwise; but they may be formed in any desired way and connected together in any suitable manner.

In use with the construction shown the valve proper will be placed on the seat, with the part I against the latter. The holder E will then be placed over the valve proper, with the part L within the socket F and the projection J within the socket K, whereupon the screws H will be inserted and adjusted to draw the holder against the valve proper until the part L is sufficiently compressed to give the desired elastic resistance. The part I will then resist unseating until the internal pressure within the valve is sufficient to overcome the elastic resistance of the part L, whereby the part I will unseat sufficiently to relieve this pressure. The wide and convex outer face of the part I will deflect the discharge from the valve and protect the part L from contact therewith. The part I is preferably of non-heat-conducting material and impermeable, so that it protects the part L from the heat of the fluid within the valve and from contact therewith. When the part I is formed of packing composition or other suitable seating material, it can yield and adapt itself to the seat sufficiently to make an absolutely tight closure, and it will still have durability enough to avoid impairment of its seating-face despite the great pressure with which it is sometimes adjusted toward the seat. The parts I and L being connected together avoids any danger of displacement of either during assembling or during escape from the valve.

It will be seen that my invention provides improvements which can be readily and advantageously availed of, and it will be understood that the invention is not limited to the particular details of construction, arrangement, and use set forth as constituting its preferred form, but that it can be employed for such purposes and according to such details of construction and arrangement as circumstances or the judgment of those skilled in the art may dictate without departing from the spirit of the invention.

In the construction shown in Fig. 4 the valve proper (lettered D') consists of a flat-faced composition block I' and a rubber block L', the two being connected together by a mortise or dovetailed connection $g$. The block L' here has an upward-guiding projection K', which passes through a guiding-socket J' in a flat holder E'. (Shown in dotted lines.)

In Figs. 5 and 6 a safety-valve is shown in which the seat C'' consists of a ring of composition or packing material clamped in the valve-shell B'' by a thimble $h$, while the valve proper, D'', consists of a metal or other facing member I'' and a rubber block L'', compressed by the holder E'' to force the plate I'' against the seat. In this construction the plate I'' has flat top and bottom faces and the block L'' is cemented to the plate and has a convex top face $i$, fitting the socket F in the holder, no other guiding provision being shown. In this construction the rubber is protected by the plate and the two are fixed together to prevent their separation.

The members I and L are preferably reinforced against relative displacement by one or more pins or studs $j$, as shown in Fig. 1, wherein metal pins are shown as partially in one member and partially in the other member before the members are fixed together. In Fig. 5 studs $j'$, projecting from the plate I'', are shown for this purpose.

What I claim is—

1. An article of manufacture consisting of a valve proper comprising in combination a facing member of relatively unyielding material and a backing member of relatively yielding material, permanently united to constitute one body, substantially as described.

2. A valve proper comprising in combination a facing member of semiyielding seating composition and a backing member of yielding material, substantially as described.

3. A valve proper comprising in combination a facing member of semiyielding seating composition and a backing member of yielding material, permanently united to constitute one body, substantially as specified.

4. A spherical valve proper consisting of a facing member of semiyielding seating composition and a backing member of yielding rubber.

In witness whereof I have hereunto signed my name in the presence of two subscribing witnesses.

EDWARD E. GOLD.

Witnesses:
GEORGE H. FRASER,
FRED WHITE.